US011690320B2

United States Patent
Anderson

(10) Patent No.: US 11,690,320 B2
(45) Date of Patent: Jul. 4, 2023

(54) WORK MACHINE CONTROL BASED ON MACHINE CAPABILITIES RELATIVE TO WORK ASSIGNMENT CRITERIA

(71) Applicant: Deere & Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 1002 days.

(21) Appl. No.: 16/509,123

(22) Filed: Jul. 11, 2019

(65) Prior Publication Data

US 2021/0007277 A1    Jan. 14, 2021

(51) Int. Cl.
| | | |
|---|---|---|
| A01D 41/127 | (2006.01) | |
| A01B 69/04 | (2006.01) | |
| A01B 76/00 | (2006.01) | |
| G05D 1/00 | (2006.01) | |
| G05D 1/02 | (2020.01) | |
| G06Q 10/0631 | (2023.01) | |
| G06Q 50/02 | (2012.01) | |
| A01D 75/00 | (2006.01) | |

(52) U.S. Cl.
CPC .......... *A01D 41/127* (2013.01); *A01B 69/008* (2013.01); *A01B 76/00* (2013.01); *A01D 41/1278* (2013.01); *A01D 75/00* (2013.01); *G05D 1/0088* (2013.01); *G05D 1/0212* (2013.01); *G06Q 10/06315* (2013.01); *G06Q 50/02* (2013.01); *G05D 2201/0201* (2013.01)

(58) Field of Classification Search
None
See application file for complete search history.

(56) References Cited

U.S. PATENT DOCUMENTS

| 7,415,333 | B2 | 8/2008 | Anderson |
| 9,235,214 | B2 | 1/2016 | Anderson |
| 2010/0063954 | A1 | 3/2010 | Anderson |
| 2011/0295423 | A1 | 12/2011 | Anderson |
| 2011/0295636 | A1 | 12/2011 | Anderson |

(Continued)

FOREIGN PATENT DOCUMENTS

| DE | 19800238 C1 | 8/1999 |
| DE | 69323943 T2 | 8/1999 |
| DE | 102015216081 A1 | 3/2016 |

OTHER PUBLICATIONS

German Search Report issued in application No. DE102020206737.6 dated Nov. 11, 2021 (07 pages).

*Primary Examiner* — Thomas E Worden
(74) *Attorney, Agent, or Firm* — Christopher J. Volkmann; Kelly, Holt & Christenson PLLC

(57) ABSTRACT

A method of controlling a work machine on a worksite includes receiving an indication of a work machine assignment having a worksite location and corresponding assignment criteria associated with completion of the work machine assignment, receiving a set of worksite conditions at the location, and identifying a set of machine capabilities, each machine capability corresponding to operation of a controllable subsystem on the work machine. The method includes generating a likelihood metric indicative of a likelihood that the assignment criteria will be met based on the set of worksite conditions and the set of machine capabilities, comparing the likelihood metric to a threshold, and generating a control signal that controls the work machine based on the comparison.

20 Claims, 12 Drawing Sheets

(56) References Cited

U.S. PATENT DOCUMENTS

| | | |
|---|---|---|
| 2014/0277905 A1 | 9/2014 | Anderson |
| 2017/0192431 A1 | 7/2017 | Foster et al. |
| 2017/0311534 A1 | 11/2017 | Rusciolelli et al. |
| 2018/0259977 A1 | 9/2018 | Cherepinsky et al. |
| 2018/0284749 A1* | 10/2018 | Cella ................... G06N 3/045 |
| 2019/0382113 A1* | 12/2019 | Diniz .................... G05D 1/102 |
| 2022/0413500 A1* | 12/2022 | Eazzetta .............. G05D 1/0297 |

* cited by examiner

WORK MACHINE CONTROL BASED ON MACHINE CAPABILITIES RELATIVE TO WORK ASSIGNMENT CRITERIA

FIELD OF THE DESCRIPTION

The present description generally relates to work machine control systems. More specifically, but not by limitation, the present description relates to a control system for a mobile work machine, such as an autonomous machine, that dynamically, during runtime, senses work location conditions and controls the mobile work machine based on capabilities of the machine relative to criteria of a work assignment.

BACKGROUND

There are a wide variety of different types of work machines. Those work machines can include construction machines, turf management machines, forestry machines, agricultural machines, etc. having controllable subsystem(s) that perform a variety of tasks on a worksite in accordance with a work assignment. An example work assignment is defined by a set of criteria or objectives to be performed to complete the work assignment. The controllable subsystems are controlled by a control system responsive to user input (e.g., local or remote operators) and/or through automated processes. For example, a mobile work machine may operate in semi-autonomous or fully autonomous modes.

The discussion above is merely provided for general background information and is not intended to be used as an aid in determining the scope of the claimed subject matter.

SUMMARY

A method of controlling a work machine on a worksite includes receiving an indication of a work machine assignment having a worksite location and corresponding assignment criteria associated with completion of the work machine assignment, receiving a set of worksite conditions at the location, and identifying a set of machine capabilities, each machine capability corresponding to operation of a controllable subsystem on the work machine. The method includes generating a likelihood metric indicative of a likelihood that the assignment criteria will be met based on the set of worksite conditions and the set of machine capabilities, comparing the likelihood metric to a threshold, and generating a control signal that controls the work machine based on the comparison.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4-1 and 4-2 (collectively referred to as FIG. 4) are a flow diagram showing one example of a method for controlling a work machine to perform a work machine assignment.

DETAILED DESCRIPTION

Figure 1:
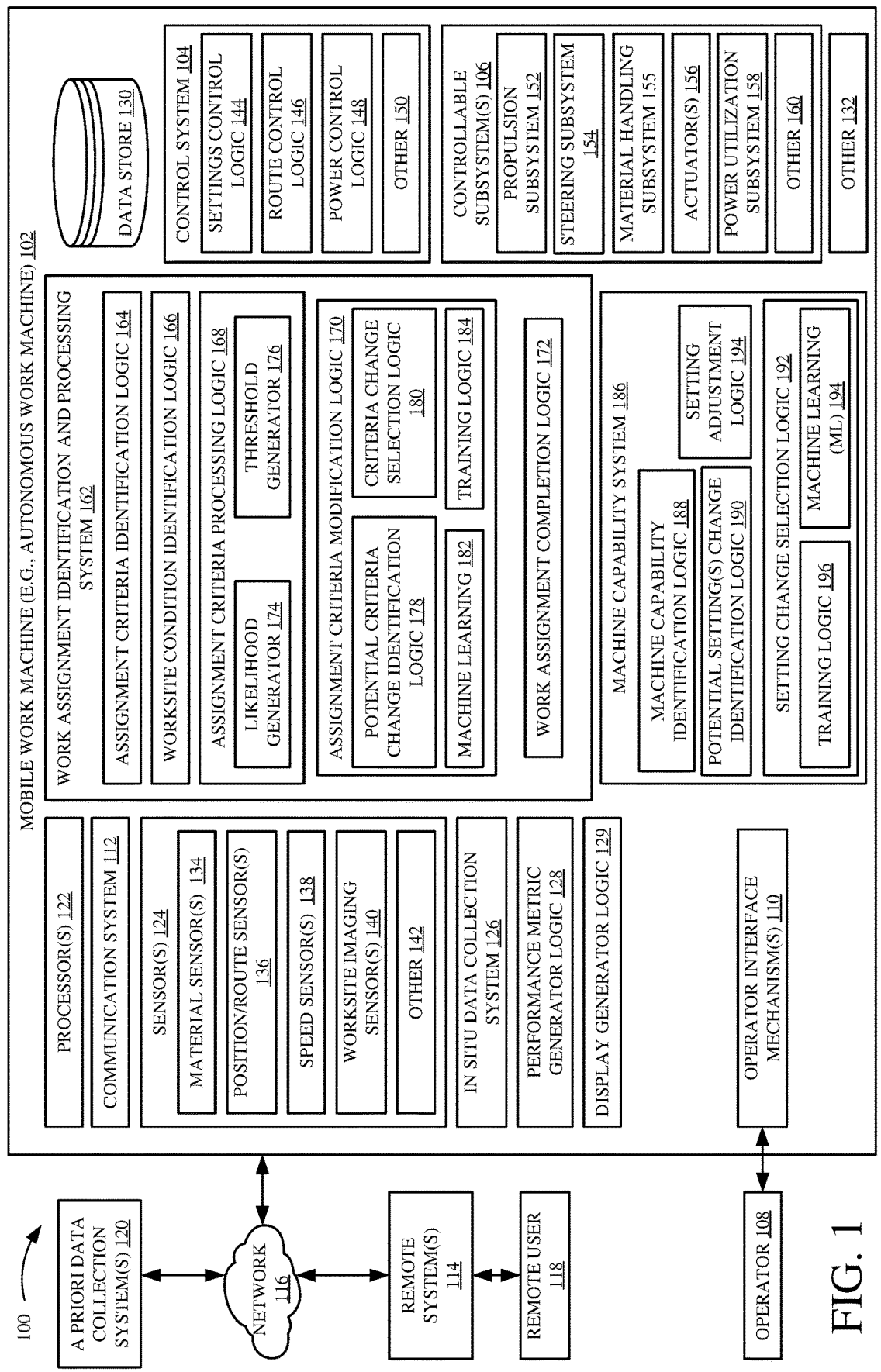
FIG. 1 is a block diagram showing one example of a work machine architecture that includes a mobile work machine.

The present disclosure generally relates to a control system for a mobile work machine, such as an autonomous machine, that dynamically, during runtime, senses work location conditions and controls the mobile work machine based on capabilities of the machine relative to criteria of a work assignment. Examples of autonomous machines perform a wide variety of different operations or tasks with a high degree of autonomy.

An autonomous work machine can be any type of work machine that moves and performs tasks on a work site. Some autonomous work machines perform aerial work operations, while other machines may perform nautical or under water work operations, and some autonomous machines perform ground-based work operations. Examples of work operations include agricultural, construction, and/or turf and forestry work operations. Particular examples of autonomous work machine include, but are not limited to, an agricultural harvester or combine, an agricultural tilling machine, a field robot, a robotic mower, a robotic snow removal machine, a robotic leaf removal machine, a robotic lawn watering machine, a robotic vacuum, a robotic floor cleaner, a material gathering machine, a material application machine, to name a view. In addition to mobile work machines, autonomous machines can include robotic or self-driving automobiles.

As used herein, autonomous machines include semi-autonomous machines which have an operator on-board or nearby to perform one or more functions. These functions may include, for example without limitation, one or more of guidance, safeguarding, diagnosis, task monitoring, task control, or data recording.

Some systems attempt to control work machines using a priori data and assignment planning based on expected or possible conditions that apply a priori rules. For instance, an example control system for an agricultural harvester may encounter adverse terrain conditions, such as wet or muddy soil, and be programmed to go to other areas of the field or otherwise wait for the conditions to be mitigated or otherwise changed. In an example of an autonomous vehicle, during operation the vehicle may encounter a construction zone by sensing traffic cones or other traffic control markers. Often, these control systems are unable to respond in an efficient manner, and, in situations where unexpected conditions are encountered, may not be able to respond in any meaningful way due to the lack of uniformity or standardization. All of this can cause inefficient and undesired operation of the machine.

The present disclosure provides a control system for a work machine, such as an autonomous machine, that senses conditions of a work location and identifies capabilities of the various controllable subsystems of the machine, to identify adjustments to the machine performance that can achieve a set of assignment criteria of a work machine assignment. Control of the machine can include adjustment of the machine operating settings and parameters, either automatically and/or through user input, or adjustment of the assignment criteria for further operation of the machine to complete the work assignment. As discussed in examples below, this control improves operation of the machine and can account for unexpected conditions that may be encountered by the machine in performing the work assignment. Some ways in which the performance is improved includes decreased latency that may be otherwise realized by a machine ceasing operation to wait for the conditions to change, and increased performance through automated setting selection and application dynamically during runtime. Thus, and as discussed in further detail below, the present control architecture can provide significant advantages.

FIG. 1 is a block diagram showing one example of a work machine architecture 100 that includes a mobile work machine 102. Work machine 102 is illustratively an autonomous work machine having a control system 104 configured to control a set of controllable subsystems 106 that perform operations on a worksite. As noted above, an autonomous machine can operate in a fully autonomous mode and/or a semi-autonomous mode. For instance, an operator 108 can interact with and control work machine 102 through operator interface mechanism(s) 110. Operator interface mechanism(s) 110 can include such things as a steering wheel, pedals, levers, joysticks, buttons, dials, linkages, etc. In addition, they can include a display device that displays user actuatable elements, such as icons, links, buttons, etc. Where the device is a touch sensitive display, those user actuatable items can be actuated by touch gestures. Similarly, where mechanism(s) 110 includes speech processing mechanisms, then operator 108 can provide inputs and receive outputs through a microphone and speaker, respectively. Operator interface mechanism(s) 110 can include any of a wide variety of other audio, visual or haptic mechanisms.

Work machine 102 includes a communication system 112 configured to communicate with other systems or machines in architecture 100. For example, communication system 112 can communicate with other local machines, such as other machines operating on a same worksite as work machine 102. In the illustrated example, communication system 112 is configured to communicate with one or more remote systems 114 over a network 116. Network 116 can be any of a wide variety of different types of networks. For instance, it can be a wide area network, a local area network, a near field communication network, a cellular communication network, or any of a wide variety of other networks, or combinations of networks.

A remote user 118 is illustrated as interacting with remote system 114, such as to receive communications from or send communications to work machine 102 through communication system 112. For example, but not by limitation, remote user 118 can receive communications, such as notifications, requests for assistance, etc., from work machine 102 on a mobile device.

Work machine 102 is also illustrated as communicating with one or more a priori data collection systems 120. System(s) 120 are configured to collect a priori data that can be used by work machine 102 in performing a work assignment on a worksite. A priori data can be generated from a wide variety different types or sources, such as from aerial or satellite images, thermal images, etc. The a priori data can be used to generate a model, such as a predictive map, that can be used to control work machine 102. Examples of a priori data include, but are not limited to, location conditions that identify various conditions that can affect operation of work machine 102.

FIG. 1 also shows that work machine 102 includes one or more processors 122, sensors 124, and in situ data collection system 126, performance metric generator logic 128, display generator logic 129, a data store 130, and can include other items 132 as well. Sensors 124 can include any of a wide variety of sensors depending on the type of work machine 102. For instance, sensors 124 can include material sensors 134, position/route sensors 136, speed sensors 138, worksite imaging sensors 140, and can include other sensors 142 as well. Material sensors 134 are configured to sense material being moved, processed, or otherwise worked on by work machine 102. In the case of an agricultural harvester, material sensors 134 include yield sensors.

In situ (or worksite) data (such as field data) can be obtained from sensors on the machine and/or sensors on a support machine that works in parallel with work machine 102 during the work assignment.

Position/route sensors 136 are configured to identify a position of work machine 102 and a corresponding route (e.g., heading) of work machine 102 as it traverses the worksite. Speed sensors 138 are configured to output a signal indicative of a speed of work machine 102. Worksite imaging sensors 140 are configured to obtain images of the worksite, which can be processed, for example by in situ data collection system 126, to identify conditions of the worksite. Examples of conditions include, but are not limited to, terrain topology, terrain soil conditions, obstacles that inhibit operation of work machine 102, etc. In an example agricultural harvester, signals from worksite imaging sensors 140 can be used to identify crop characteristics, such as an expected yield, whether the crop being harvested is "downed", etc.

Control system 104 can include settings control logic 144, route control logic 146, power control logic 148, and it can include other items 150. Controllable subsystems 106 can include propulsion subsystem 152, steering subsystem 154, one or more different actuators 156 that can be used to change machine settings, machine configuration, etc., power utilization subsystem 158, and can include a wide variety of other systems, some of which are described below.

Settings control logic 144 can control one or more of subsystems 106 in order to change machine settings based upon the predicted and/or observed conditions or characteristics of the worksite. By way of example, in the case of an agricultural harvesting machine or combine, settings control logic 144 can actuate actuators 156 that change the positioning of a header, the concave clearance, etc., based upon the predicted yield or biomass to be encountered by the machine. In the case of an agricultural tilling machine, settings control logic 144 can control the positioning or down pressure on the tilling implement by controlling actuators 156.

Route control logic 146 can control steering subsystem 154. By way of example, if, through automated detection and/or operator 108 input, control system 104 determines that a severe thunderstorm is approaching, route control logic 266 can control work machine 102 to harvest the field in a minimum amount of time. Route control logic 146 can identify areas of relatively high yield to preferentially harvest those areas first, so that a majority of the yield can be obtained from the field prior to the arrival of the thunderstorm. This is just one example. In another example, it may be that soil characteristics, such as soil moisture, the presence of mud, etc., may be identified that affect traction. Route control logic 266 can control steering subsystems 274 to change the route or direction of work machine 102 based upon the predicted traction at different routes through the field. In an example autonomous automobile, route control logic 146 can identify a route for the automobile based on traffic markers.

Power control logic 148 generates control signals to control power utilization subsystem 158. For instance, it can allocate power to different subsystems, generally increase power utilization or decrease power utilization, etc. These are just examples and a wide variety of other control systems can be used to control other controllable subsystems in different ways as well.

Figure 2:
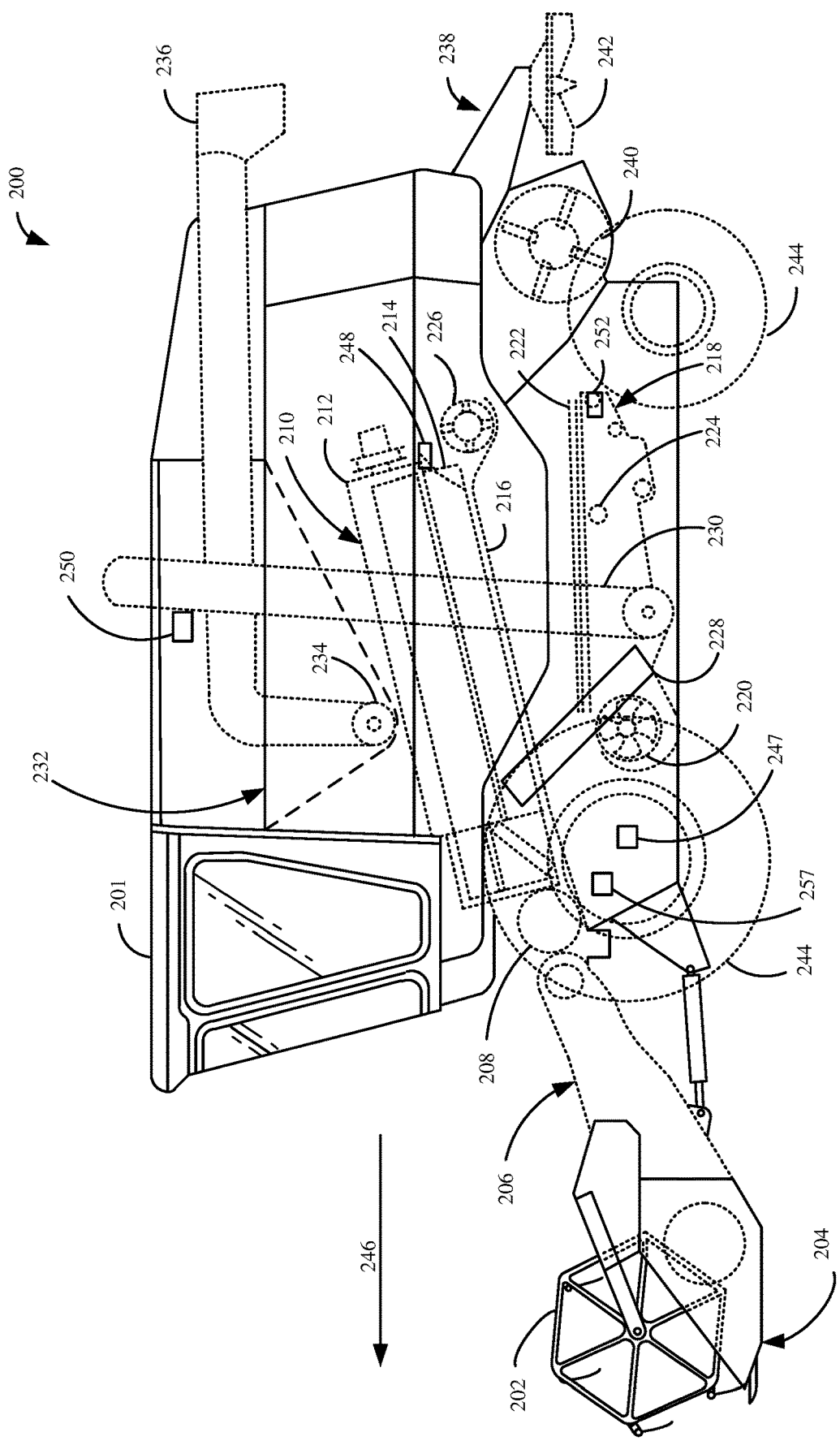
FIG. 2 is a partial schematic, partial pictorial illustration of one example of a work machine.

As noted above, work machine 102 can take a wide variety of different forms. FIG. 2 illustrates one example of an agricultural work machine. More specifically, FIG. 2 is a partial pictorial, partial schematic, illustration of a combine harvester (or combine) 200.

It can be seen in FIG. 2 that combine 200 illustratively includes an operator compartment 201, which can have a variety of different operator interface mechanisms, for controlling combine 200, as will be discussed in more detail below. Combine 200 can include a set of front end equipment that can include header 202, and a cutter generally indicated at 204. It can also include a feeder house 206, a feed accelerator 208, and a thresher generally indicated at 210. Thresher 210 illustratively includes a threshing rotor 212 and a set of concaves 214. Further, combine 200 can include a separator 216 that includes a separator rotor. Combine 200 can include a cleaning subsystem (or cleaning shoe) 218 that, itself, can include a cleaning fan 220, chaffer 222 and sieve 224. The material handling subsystem in combine 200 can include (in addition to a feeder house 206 and feed accelerator 208) discharge beater 226, tailings elevator 228, clean grain elevator 230 (that moves clean grain into clean grain tank 232) as well as unloading auger 234 and spout 236. Combine 200 can further include a residue subsystem 238 that can include chopper 240 and spreader 242. Combine 200 can also have a propulsion subsystem that includes an engine (or other power source) that drives ground engaging wheels 244 or tracks, etc. It will be noted that combine 200 may also have more than one of any of the subsystems mentioned above (such as left and right cleaning shoes, separators, etc.).

In operation, and by way of overview, combine 200 illustratively moves through a field in the direction indicated by arrow 246. As it moves, header 202 engages the crop to be harvested and gathers it toward cutter 204. After it is cut, it is moved through a conveyor in feeder house 206 toward feed accelerator 208, which accelerates the crop into thresher 210. The crop is threshed by rotor 212 rotating the crop against concave 214. The threshed crop is moved by a separator rotor in separator 216 where some of the residue is moved by discharge beater 226 toward the residue subsystem 238. It can be chopped by residue chopper 240 and spread on the field by spreader 242. In other implementations, the residue is simply dropped in a windrow, instead of being chopped and spread.

Grain falls to cleaning shoe (or cleaning subsystem) 218. Chaffer 222 separates some of the larger material from the grain, and sieve 224 separates some of the finer material from the clean grain. Clean grain falls to an auger in clean grain elevator 230, which moves the clean grain upward and deposits it in clean grain tank 232. Residue can be removed from the cleaning shoe 218 by airflow generated by cleaning fan 220. That residue can also be moved rearwardly in combine 200 toward the residue handling subsystem 238.

Tailings can be moved by tailings elevator 228 back to thresher 210 where they can be re-threshed. Alternatively, the tailings can also be passed to a separate re-threshing mechanism (also using a tailings elevator or another transport mechanism) where they can be re-threshed as well.

FIG. 2 also shows that, in one example, combine 200 can include ground speed sensor 247, one or more separator loss sensors 248, a clean grain camera 250, and one or more cleaning shoe loss sensors 252. Ground speed sensor 247 illustratively senses the travel speed of combine 200 over the ground. This can be done by sensing the speed of rotation of the wheels, the drive shaft, the axel, or other components. The travel speed and position of combine 200 can also be sensed by a positioning system 257, such as a global positioning system (GPS), a dead reckoning system, a LORAN system, or a wide variety of other systems or sensors that provide an indication of travel speed.

Cleaning shoe loss sensors 252 illustratively provide an output signal indicative of the quantity of grain loss by both the right and left sides of the cleaning shoe 218. In one example, sensors 252 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 252 can comprise only a single sensor as well, instead of separate sensors for each shoe.

Separator loss sensor 248 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 248 may also comprise only a single sensor, instead of separate left and right sensors.

It will also be appreciated that sensor and measurement mechanisms (in addition to the sensors already described) can include other sensors on combine 200 as well. For instance, they can include a residue setting sensor that is configured to sense whether machine 200 is configured to chop the residue, drop a windrow, etc. They can include cleaning shoe fan speed sensors that can be configured proximate fan 220 to sense the speed of the fan. They can include a threshing clearance sensor that senses clearance between the rotor 212 and concaves 214. They include a threshing rotor speed sensor that senses a rotor speed of rotor 212. They can include a chaffer clearance sensor that senses the size of openings in chaffer 222. They can include a sieve clearance sensor that senses the size of openings in sieve 224. They can include a material other than grain (MOG) moisture sensor that can be configured to sense the moisture level of the material other than grain that is passing through combine 200. They can include machine setting sensors that are configured to sense the various configurable settings on combine 200. They can also include a machine orientation sensor that can be any of a wide variety of different types of sensors that sense the orientation or pose of combine 200. Crop property sensors can sense a variety of different types of crop properties, such as crop type, crop moisture, and other crop properties. They can also be configured to sense characteristics of the crop as they are being processed by combine 200. For instance, they can sense grain feed rate, as it travels through clean grain elevator 230. They can sense yield as mass flow rate of grain through elevator 230, correlated to a position from which it was harvested, as indicated by position sensor 257, or provide other output signals indicative of other sensed variables.

Referring again to FIG. 1, performance metric generator logic 128 illustratively generates performance metrics indicative of the operational performance of work machine 102. Display generator logic 129 illustratively generates a control interface display for operator 108. The display can be an interactive display with user input mechanisms for interaction by operator 108.

Figure 3:
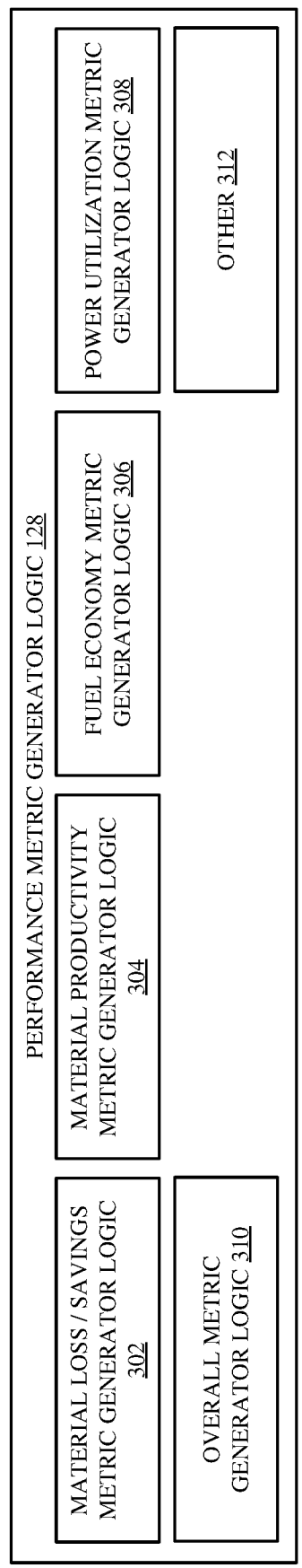
FIG. 3 is a block diagram showing one example of performance metric generator logic.

FIG. 3 is a block diagram showing one example of performance metric generator logic 128, in more detail. In the example shown in FIG. 3, performance metric generator logic 128 includes material lost/savings metric generator logic 302, material productivity metric generator logic 304, fuel economy metric generator logic 306, power utilization metric generator logic 308, overall metric generator logic 310, and it can include a wide variety of other items 312 as well. Some ways of generating performance metrics are shown in more detail in co-pending US Patent Publications Numbers 2015/0199637 A1, 2015/0199360 A1, 2015/0199630 A1, 2015/0199775 A1, 2016/0078391 A1 which are incorporated herein by reference.

Material loss/savings metric generator logic 302 illustratively generates a metric indicative of material savings or loss that the machine 102 is experiencing. In the case of an agricultural harvesting machine, this can include grain loss or savings generated by sensing and combining items, such as the mass flow of crop through the harvester sensed by a mass flow sensor, tailings volume of tailings of output by the harvester using a volume sensor, crop type, the measured loss on the harvester using various loss sensors (such as separator loss sensors, cleaning shoe loss sensors, etc.), among others. The metric can be generated by performing an evaluation of the loss using fuzzy logic components and an evaluation of the tailings, also using fuzzy logic components. Based upon these and/or other considerations, loss/savings metric generator logic 302 illustratively generates a loss/savings metric indicative of the performance of the machine, with respect to material loss/savings.

Material productivity metric generator logic 304 uses the sensor signal generated by sensors on the machine to sense productivity of the machine. In the case of an agricultural harvester, logic 304 illustratively uses the sensor signals generated by sensors on the machine to sense vehicle speed, mass flow of grain through the machine, and the machine configuration and generates an indication of crop yield and processes the crop yield to evaluate it against a productivity metric. For instance, a productivity metric plotted against a yield slope provides an output indicative of grain productivity. This is one example.

Fuel economy metric generator logic 306 illustratively generates a fuel economy metric, based upon the productivity of the machine versus fuel consumption rate sensed by sensors on the machine. For example, in the case of an agricultural harvester, this can be based upon the throughput versus fuel consumption rate, a separator efficiency metric and also, based upon sensed fuel consumption, vehicle state, vehicle speed, etc. The fuel economy metric can be based on a combination of working (e.g., harvest) fuel efficiency and a non-productive fuel efficiency. These metrics may include, respectively, the efficiency of the machine during working operations and other, non-working operations (such as when idling, etc.).

Power utilization metric generator logic 308 illustratively generates a power utilization metric based on sensor signals (or based on derived engine power used by the machine, that is derived from sensor signals). The sensors may generate sensor signals indicative of engine usage, engine load, engine speed, etc. The power utilization metric can indicate whether the machine could be more efficiently run at higher or lower power levels, etc.

Overall metric generator logic 310 illustratively generates a metric that is based upon a combination of the various metrics output by logic 302-308. It illustratively provides a metric indicative of the overall operational performance of the machine.

Referring again to FIG. 1, work machine 102 includes a work assignment identification and processing system 162 that includes assignment criteria identification logic 164, worksite condition identification logic 166, assignment criteria processing logic 168, assignment criteria modification logic 170, work assignment completion logic 172, and can include other items as well.

Before discussing operation of system 162 in further detail, a brief overview will be provided. Briefly, system 162 is configured to identify a work assignment for work machine 102, and to process the work assignment through control of controllable subsystems 106 to perform and complete the work assignment. A work assignment can be received from another system, such as remote system 114, or can be generated by work machine 102. In either case, assignment criteria identification logic 164 is configured to identify assignment criteria in, or otherwise associated with, the work assignment. An assignment criterion illustratively identifies a requirement to be met for the work assignment to be completed. Assignment criteria can take a wide variety of various forms. For example, an assignment criterion can be navigation or route-based. In the case of an agricultural harvesting machine, navigation or route-based criteria define an area of the worksite and/or a path to be taken in performing an agricultural operation on the worksite. In the case of an autonomous automobile, navigation or route-based criteria can identify a navigational route to be taken to a destination location. Time-based assignment criteria can include a time in which the work assignment is to be completed. Performance-based assignment criteria can identify a target performance metric to be achieved, such as those discussed above with respect to FIG. 3.

Worksite condition identification logic 166 is configured to identify a set of conditions of the worksite that is the target of the work assignment. These conditions can be identified from a priori data, obtained for example from system 120, and/or from data obtained by in situ data collection system 126. For instance, worksite conditions can be identified from images acquired through worksite imaging sensors 140. Worksite conditions can include, without limitation, crop conditions, vegetation conditions, soil conditions, surface conditions, atmospheric conditions, activities, and objects present on the worksite.

Assignment criteria processing logic 168 is configured to process the assignment criteria identified by logic 164. This can include a likelihood generator 174 configured to generate a likelihood metric indicative of a likelihood that the assignment criteria will be met. In examples, the likelihood metric is obtained from statistics based on historical outcomes, results of monte carlo simulations of future outcomes, accumulation of evidence for success, re-enforcement learning, or any other suitable approach. A threshold generator 176 is configured to generate or otherwise identify a threshold to which the likelihood metric is compared.

Assignment criteria modification logic 170 is configured to modify some or all of the assignment criteria, and includes potential criteria change identification logic 178 configured to identify which assignment criteria in the work assignment can be changed, and criteria change selection logic 180 configured to select an assignment criterion (or assignment criteria) to be changed. Logic 170 can also include a machine learning component 182, and training logic 184 configured to train machine learning component 182.

Work machine 102 also includes a machine capability system 186, which includes machine capability identification logic 188 configured to identify a set of machine capabilities of work machine 102. System 186 also includes potential settings change identification logic 190 configured to identify potential setting changes to achieve the machine capabilities identified by logic 188. Settings adjustment logic 192 is configured to adjust the settings identified by logic 190. In one example, logic 192 utilizes settings control logic 144 to control settings of various subsystems 106 to achieve an identified machine capability. Logic 192 can include a machine learning component 194 and training logic 196 configured to train machine learning component 194.

Systems 162 and 186, in one example, utilize artificial intelligence (AI) to identify machine capabilities, and to determine how to adjust machine settings to achieve assignment criteria or to otherwise adjust the assignment criteria, based on in situ data. The machine learning components 182 and/or 194 can include any of a variety of different types of learning mechanisms, such as neural network that is trained by the corresponding training logic using training data. Briefly, a neural network can comprise a deep neural network (DNN), such as a convolutional neural network (CNN). Of course, other types of classification or learning mechanisms, such as rule-based classifiers, Bayesian network, decision trees, etc. can be utilized.

Figures 1, 4:
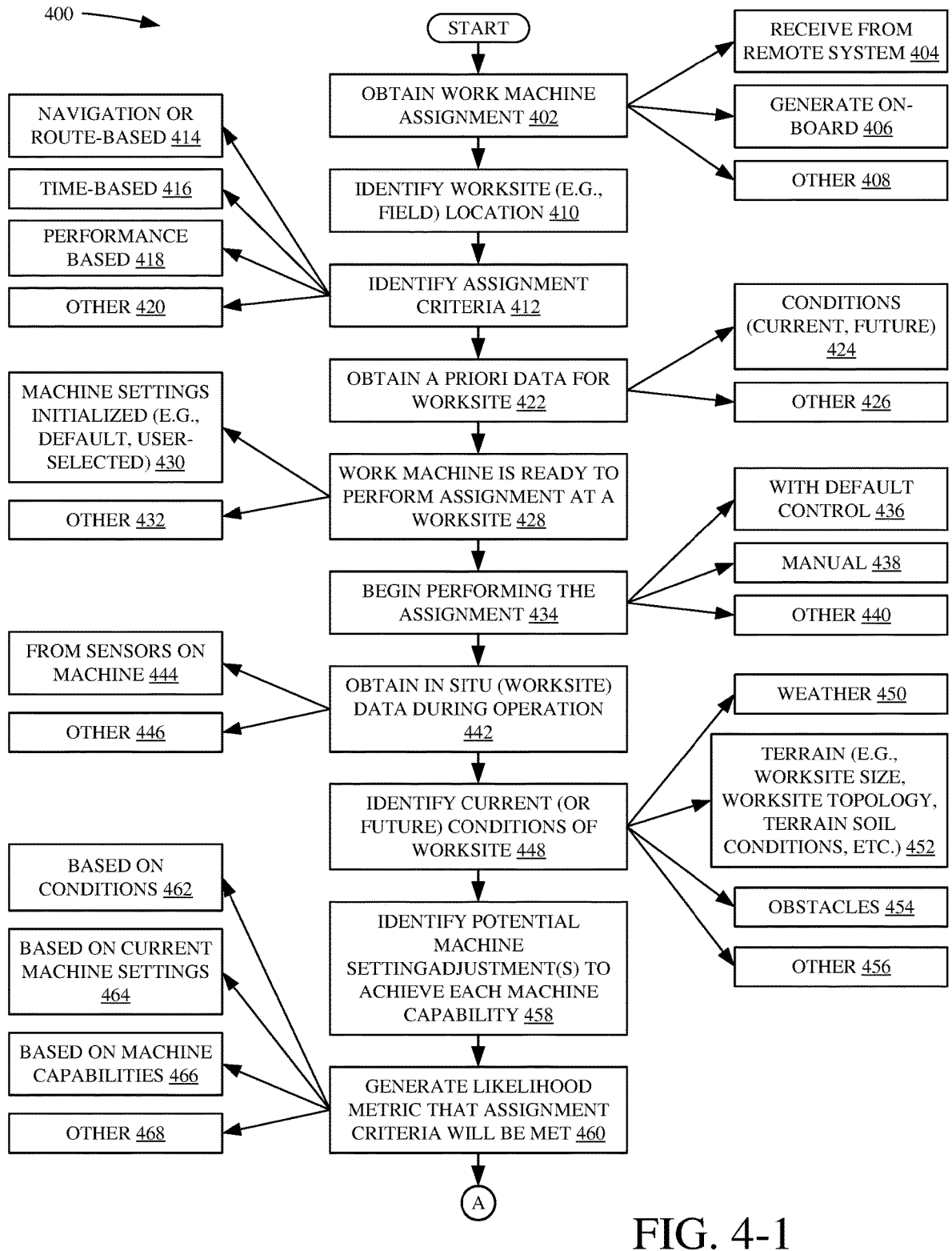
Figures 2, 4:
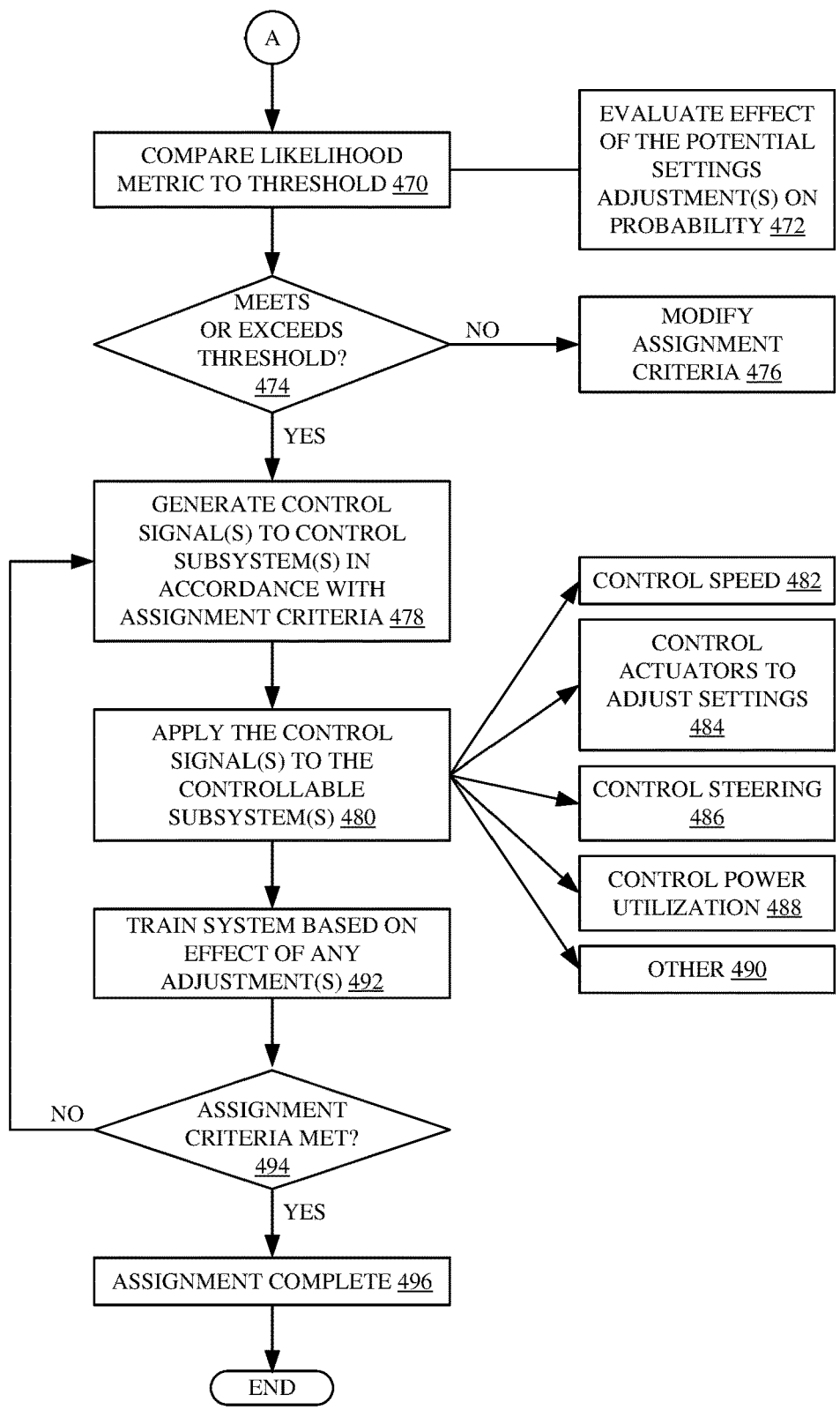

FIG. 4 illustrates one example of a method 400 for controlling a work machine to perform a work machine assignment. For sake of illustration, but not by limitation, method 400 will be described in the context of example work machine 102, illustrated in FIG. 1.

At block 402, a work machine assignment is obtained or otherwise identified by system 162. For example, a work machine assignment can be obtained from remote system 114. This is represented by block 404. In another example, a work machine assignment can be generated by work machine 102, such as using system 162 or otherwise. This is represented by block 406. Of course, a work machine assignment can be obtained in other ways as well. This is represented by block 408.

In an example autonomous agricultural harvester, a work machine assignment can identify a harvesting operation to be performed for a field. In an example autonomous agricultural tractor pulling a tilling implement, a work machine assignment can identify a field to be tilled. In an example autonomous automobile, a work machine assignment can identify a starting location, a destination location, and a path to be taken from a starting location to the destination location.

At block 410, a worksite location is identified for the work machine assignment obtained at block 402. For example, in the case of an agricultural harvester, this can identify the location of the field to be harvested for the work machine assignment.

At block 412, a set of assignment criteria (at least one assignment criterion) is identified by logic 164. As noted above, assignment criteria can take any of a wide variety of forms. For example, they can be navigation or route-based. This is represented by block 414. To illustrate, in the case of an agricultural machine, such as a harvester or tilling machine, route-based criteria can identify a path to be taken through the field and/or a preferred order for processing various portions of the field. In the case of an autonomous automobile, navigation-based criteria can identify a preferred route to be taken along a set of roadways.

Assignment criteria can also comprise time-based criteria. This is represented by block 416. Time-based criteria can identify a time period within which the work assignment is to be completed.

Assignment criteria can also comprise performance-based criteria. This is represented by block 418. For example, performance-based criteria can identify various performance characteristics to be achieved by the work machine in completing the work assignment. In the case of an agricultural harvester, for example, performance-based criteria can identify a target loss/savings metric, a target productivity metric, a target fuel economy metric, a target power utilization, and/or an overall performance metric. Examples of metrics are discussed above with respect to FIG. 3. In one particular example, the performance-based criteria identifies a target yield (e.g., percentage of on-plant grain successfully collected) to be achieved with a target fuel efficiency.

Of course, assignment criteria can comprise other types of criteria as well. This is represented by block 420.

At block 422, a priori data can be obtained for the worksite. For example, this can include current or future conditions 424, and can include other items 426 as well. Examples of conditions 424 include, but are not limited to, current or future weather conditions, terrain conditions, or indications of other obstacles or impediments to operation of work machine 102.

At block 428, the work machine is ready to perform the work assignment at the worksite. The machine settings can be initialized by settings control logic 144. This is represented by block 430. For example, a set of default settings can be utilized. These default settings can be identified in the work machine assignment. Alternatively, or in addition, the initial machine settings can be user-selected, such as selected by operator 108 and/or remote user 118. The work machine can be initialized to perform the work assignment in other ways as well. This is represented by block 432.

At block 434, work machine 102 begins performing the work assignment at the worksite. This can include default control using the initialized machine settings in an autonomous mode in which control system 104 controls controllable subsystem 106 in accordance with the work assignment and associated criteria. This is represented by block 436. Alternatively, or in addition, the work assignment can be performed based on manual input from operator 108. This is represented by block 438. Machine 102 can be controlled in other ways as well. This is represented by block 440.

At block 440, in situ (or worksite) data is obtained during the operation of work machine 102 on the worksite. This can include data from sensors 124 on machine 102. This is represented by block 444. For example, worksite imaging sensors 140 obtain images of the worksite in a path of work machine 102. Of course, the in situ data can be obtained in other ways as well. This is represented by block 446.

At block 448, current or future conditions of the worksite are identified by logic 166. These conditions can be identified from the in situ data obtained at block 442 and/or the a priori data obtained at block 422. The conditions can take a wide variety of different forms. For example, weather conditions can be identified at block 450. This can include current or anticipated precipitation. At block 452, terrain conditions can be identified. Examples of terrain conditions include, but are not limited to, terrain topology (e.g., slope), soil type, soil moisture or other conditions.

The conditions can also indicate obstacles (block 454) that are in a path of the work machine, or otherwise are likely to inhibit operation of work machine 102 in completing the work machine assignment. Other conditions can be identified as well. This is represented by block 456.

For sake of illustration, but not by limitation, in an example autonomous agricultural harvester, the conditions identified at block 448 can indicate that the crop being harvested is "downed", the machine is approaching an area of standing water or muddy soil, etc. In an example autonomous tractor pulling a tilling implement, block 448 identifies muddy conditions that are likely to affect tillage quality. In an example autonomous automobile, block 448 identifies that the automobile is entering a construction zone having traffic control devices, such as cones, arrows, etc.

At block 458, logic 188 identifies a set of machine capabilities of work machine 102 and logic 190 identifies potential machine setting adjustments to achieve each machine capability in the set of machine capabilities. Illustratively, a machine capability corresponds to operation of one or more of controllable subsystems 106. For instance, a machine capability can include a maximum or available speed, torque, etc. for the propulsion system 152. In this case, the potential machine settings at block 458 can correspond to engine speed adjustments, transmission adjustments, or other adjustments that can be made to achieve this machine capability. In another example, the machine capability includes controlling the steering subsystem to navigate the machine along a route on the worksite. In the case of an agricultural harvester, potential machine setting adjustments include adjusting the configuration of the header, the speed or other configuration of the thresher, etc. In another example, the machine capability includes methods on how to control subsystems for a particular in situ data. In the case of an agricultural harvester where crop detected is lodged by sensors on machine, the machine capability would be a method for using sensed data about the crop to adjust subsystems such as header height and harvester speed. In other examples, machine capabilities include the sensors and/or actuators to detect conditions in the environment and then physically respond to them. In still other examples, machine capabilities include data such as a map of some worksite feature, condition, or attribute.

At block 460, likelihood generator 174 generates a likelihood metric that indicates a likelihood that the assignment criteria identified at block 412 will be met. Illustratively, this is based on the conditions identified at block 448. This is represented by block 462. Also, it can be based on the current machine settings. This is represented by block 464. Also, it can be based on the machine capabilities identified at block 458. This is represented by block 466. Of course, the likelihood metric can be generated in other ways as well. This is represented by block 468.

For sake of illustration, but not by limitation, block 460 determines the likelihood that work machine 102 will satisfy each of the assignment criteria, based on the current or future conditions of the worksite. In an example agricultural harvester, this can include determining a likelihood that a target or activity metric will be met based on the current speed settings, header settings, thresher settings, and the conditions of the worksite. Also, this can include a likelihood metric that indicates the likelihood that a target fuel economy metric, a target power utilization metric, or an overall performance metric will be met during the operation.

At block 470, the logic 168 compares the likelihood metric(s) to threshold(s) generated by threshold generator 176. The threshold can be generated in any number of ways. For example, the threshold can be set on a criteria-by-criteria basis. That is, each criteria can be evaluated separately, to compare a likelihood metric that the assignment criteria will be met relative to an individual threshold for that criteria. In another example, the threshold can indicate a number of the criteria that are likely to be met during operation of work machine 102. In one example, the threshold is a percentage (50%, 75%, 100%, etc.) to which the likelihood is compared.

In one example of block 470, the effect of the potential setting adjustments (identified at block 458) on the likelihood can be evaluated. This is represented by block 472. For example, method 400 can perform hypothetical analysis to determine how the likelihood will change for the various potential setting adjustments. In an agricultural harvester example, block 472 determines a likelihood metric that indicates a likelihood the assignment criteria will be met if the engine speed is increased, and the header and thresher subsystems are changed.

At block 474, logic 168 determines whether the likelihood metric meets or exceeds the threshold. If the likelihood metric does not meet the threshold, even with the potential setting adjustments, the method proceeds to block 476 in which one or more of the assignment criteria are modified. This is discussed in further detail below.

At block 478, control signals are generated by control system 104 to control subsystems 106 in accordance with the assignment criteria. This can include the unmodified assignment criteria if the threshold is met at block 474, or the modified assignment criteria from block 476 if the threshold was not met.

At block 480, the control signals are applied to the controllable subsystems. This can include controlling the speed at block 480, controlling actuators to adjust settings at block 484, controlling steering at block 486, controlling power utilization to block 488, and can include other control as well. This is represented by block 490.

At block 492, the system can be optionally trained based on the effect of any of the above-mentioned adjustments. For instance, if machine settings were adjusted to meet the threshold, training logic 198 can train machine learning component 194 to learn the effects of the adjustments on the machine capabilities. In another example, if the work assignment criteria is modified at block 476, training logic 184 can train machine learning component 182 to learn the effects of the assignment criteria adjustment.

At block 494, logic 172 determines whether the assignment criteria has been met. If so, the method proceeds to block 496 in which the work assignment is completed.

Figure 5:
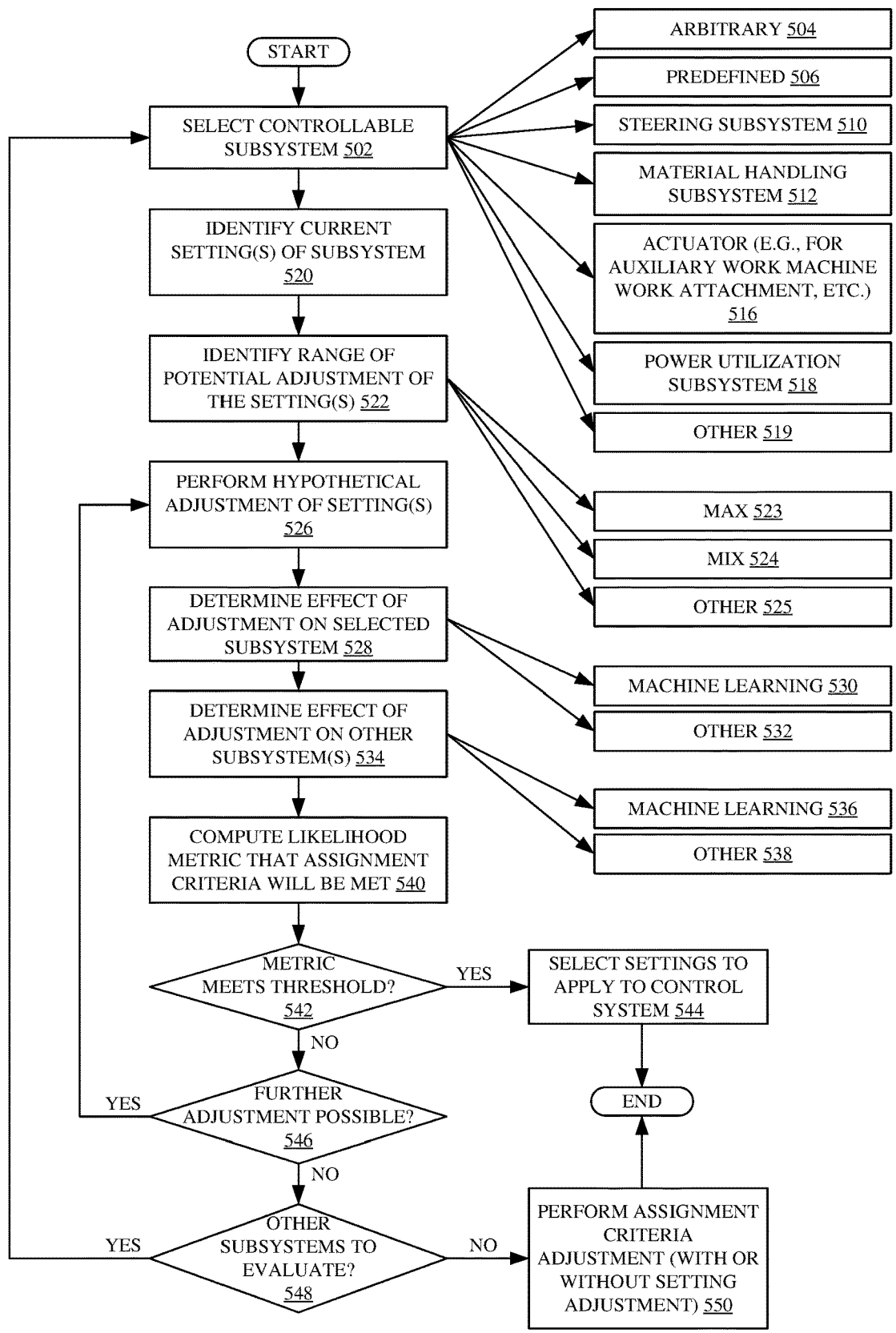
FIG. 5 is a flow diagram showing one example of a method for identifying and applying machine setting adjustments.

FIG. 5 illustrates one example of a method 500 for identifying and applying machine setting adjustments. For sake of illustration, but not by limitation, method 500 will be described in the context of work machine 102 illustrated in FIG. 1.

At block 502, logic 188 selects one of the controllable subsystems to evaluate. The subsystem can be selected from the set of controllable subsystems 106 in any of a number of ways. For example, the selection can be arbitrary (block 504) or it can be pre-defined (block 506).

In any case, the selected subsystem can be any of a wide variety of subsystems including, but not limited to, a propulsion subsystem 508, a steering subsystem 510, a material handling system 512, an actuator (block 514—such as an actuator for controlling an auxiliary work machine, a work attachment, etc.), a power utilization subsystem 518, and can include other subsystems 519 as well.

Logic 190 identifies the current settings of the selected subsystem at block 520, and identifies the potential range of adjustments of the settings for the subsystem at block 522. For example, it can identify a maximum setting 523, a minimum setting 524, or it can identify a range in other ways. This is represented by block 525.

In the case of an agricultural harvester, block 522 can identify a maximum engine speed for propulsion system 152, and a range of transmission settings for transferring the engine power to traction units, such as wheels or tracks on the machine.

At block 526, logic 192 performs a hypothetical adjustment of the settings, to determine the effect of the adjustment on the subsystem at block 528. For example, the effect of a hypothetical adjustment of a setting can be determined using machine learning component 198 (represented by block 530). The effect can be determined in other ways as well. This is represented by block 532.

At block 534, the method determines the effect of the adjustment on other subsystems. This can also be done by machine learning component 194 (block 536), or in other ways (block 538).

For sake of illustration, but not by limitation, using machine learning component 194, system 186 identifies an effect of an adjustment to propulsion system 152 on both the propulsion system 152 itself, as well as the other subsystems. Using this information, a likelihood metric is computed at block 540 to indicate a likelihood that the assignment criteria for the work assignment will be met. This is represented by block 540. If the likelihood metric meets the threshold at block 542, the settings are selected by logic 192 and are applied to control system 104 to control the corresponding subsystems 106. This is represented by block 544.

If the likelihood metric does not meet the threshold, the method proceeds to block 546 in which the method determines whether further adjustment of the settings of the selected subsystem is possible. If so, the method returns to block 526 in which the hypothetical adjustment and corresponding likelihood metric computation is performed for the further adjustment. Once the method determines that no further adjustment of the subsystem is possible, the method proceeds to block 548 in which the method determines whether there are other subsystems to evaluate. If so, the method returns to block 502 in which another one of the subsystems is selected for evaluation. Once all subsystems have been evaluated, but the likelihood metric has not met the threshold, the method proceeds to block 550 in which assignment criteria adjustment is performed. This can be done with or without setting adjustments being made within method 500.

Figure 6:
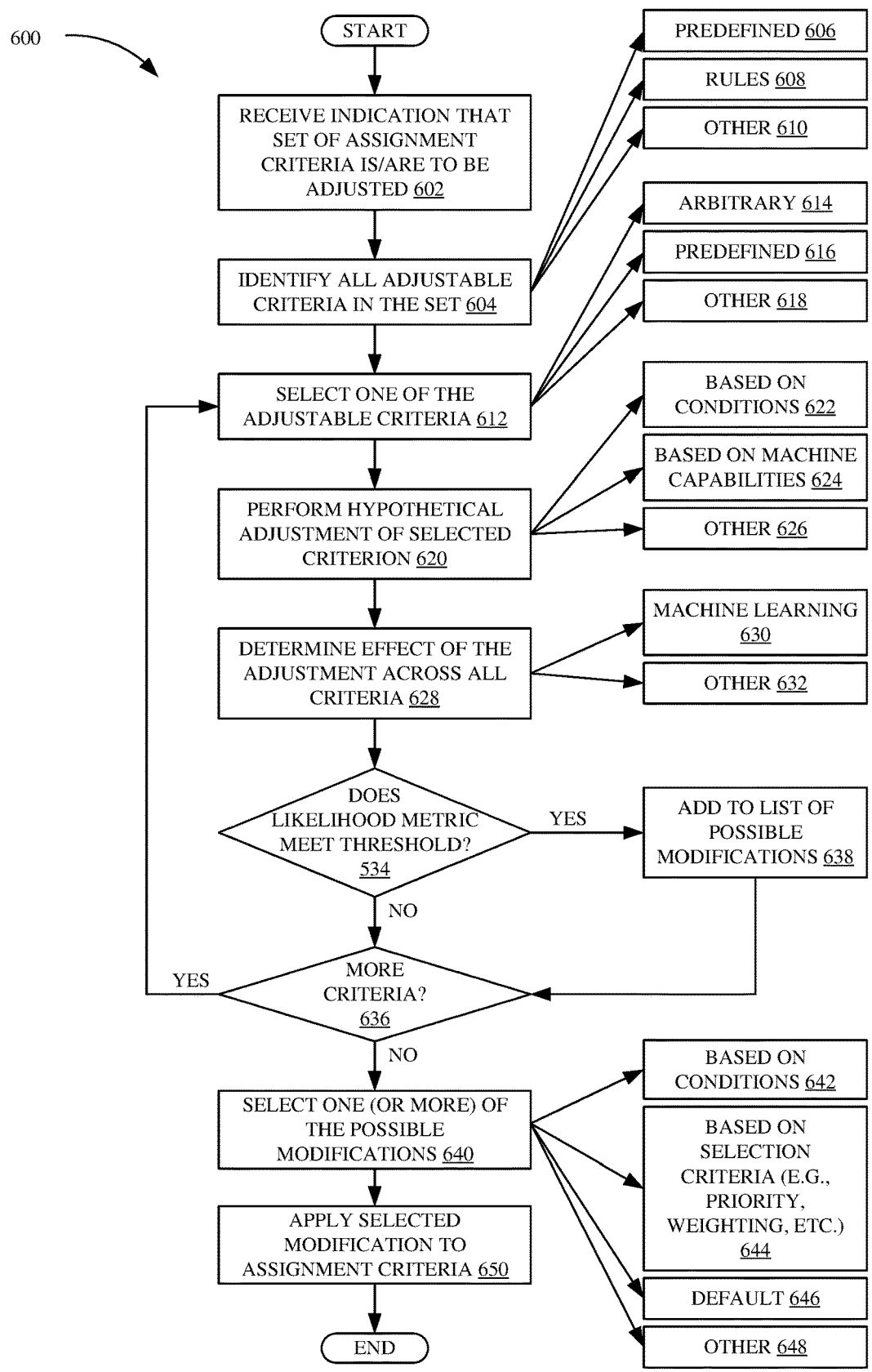
FIG. 6 is a flow diagram showing one example of a method for modifying work assignment criteria.

FIG. 6 illustrates one example of a method 600 for modifying assignment criteria for a work assignment. For sake of illustration, but not by limitation, method 600 will be described in the context of work machine 102. Method 600 provides one example of block 550 shown in FIG. 5.

At block 602, an indication is received, that indicates the assignment criteria is to be modified. For example, this indication can be in response to a determination that there have been no identified setting adjustments, corresponding to the machine capabilities, that result in a likelihood metric (indicating whether the current assignment criteria will be met) that meets or exceeds the threshold.

At block 604, all adjustable criteria in the set of assignment criteria are identified. For example, it may be that some of the criteria in the set of criteria cannot be adjusted by machine 102. The adjustable criteria can be pre-defined. For example, the criteria that cannot be adjusted can be identified in the work assignment itself. In another example, rules can be utilized to identify which assignment criteria can, or cannot, be adjusted. This is represented by block 608. The adjustable criteria can be identified in other ways as well. This is represented by block 610.

At block 612, one of the adjustable criteria is selected. This can be done arbitrarily (block 614), it can be pre-defined (block 616), or it can be selected in other ways as well (block 618).

At block 620, logic 178 evaluates a potential adjustment of the selected criterion. In one example, a hypothetical evaluation of the potential adjustment can be based on the worksite conditions. This is represented by block 622. In another example, the evaluation can be based on the machine capabilities. This is represented by block 624. The evaluation can be made in other ways as well. This is represented by block 626.

At block 628, the method determines the likely effect of the hypothetical adjustment of the selected criterion across all of the assignment criteria. This can be based on a machine learning algorithm that has been trained based on training data and/or feedback from prior criteria adjustments on work machine 102. This is represented by block 630. Of course, the effect can be determined in other ways as well. This is represented by block 632. In any case, a likelihood metric is generated indicative of whether the set of assignment criteria will be met if the potential adjustment to the selected assignment criterion is made.

At block 634, logic 170 determines whether the likelihood metric meets a likelihood threshold. Examples of likelihood metrics and thresholds are discussed above. If block 634 determines that the likelihood metric for the potential adjustment of the selected assignment criterion does not meet the threshold, the method proceeds to block 636 in which it determines whether there are any more criteria that can be adjusted. If so, the method returns to block 612 to perform hypothetical evaluation of a potential adjustment to the other criteria.

If the likelihood metric meets or exceeds the threshold at block 634, the potential criteria modification is added to a set or list of potential modifications at block 638. Block 636 then determines whether to evaluate potential adjustments to any other criterion.

Once all adjustable criteria are evaluated, the method proceeds to block 640 where one (or more) of the possible modifications are selected by logic 180. The selection can be based on the worksite conditions, which is represented by block 642. Alternatively, or in addition, the selection can be based on selection criteria, which is represented by block 644. For example, selection criteria can assign weights and/or a priority to potential modifications, e.g., based on the type of modification, the subsystems effected by the modification, the expected effect of the modification, etc.

In one example, a default adjustment or other action can be selected at block 646. For instance, a default action can be selected if the list of possible modifications is empty, or for other reasons. An example default action comprises controlling the work machine 102 to cease operation of the work assignment and/or send a communication to operator 108 and/or a remote user 118 through remote system 114. The communication can comprise a request for a human operator to take over control of work machine 102.

Of course, the assignment criteria modification can be selected in other ways as well. This is represented by block 648.

At block 650, the selected modification is applied to the set of work assignment criteria, which can then be used by control system 104 to control operation of work machine 102.

For sake of illustration, but not by limitation, aspects of method 600 will now be described in the context of example work machines.

In one example, an autonomous agricultural harvester or combine is performing a harvesting operation in a field, and encounters crop that is "downed." That is, the crop is laying or otherwise oriented in a way that makes it difficult for the header of the machine to efficiently pick the crop, and machine capability system 186 has determined that the combine lacks sufficient capabilities or skills to effectively harvest the downed crop. Method 600, in this example, identifies work assignment criteria in the work assignment that can be adjusted, and identifies potential adjustment to those criteria that have a high likelihood of being completed given the conditions of the field and the combines capabilities. In one example, the list of possible modifications generated at block 638 includes a first option that involves the combine stopping and waiting an hour (or other time period) for a human operator to reach the machine and manually control it to harvest the downed crop. This involves adjustment of time criteria in the work assignment. A second option includes the combine moving to another area of the field, to harvest the crop, while waiting for the human operator to arrive to harvest the area having the downed crop. This involves modification of both time-based work criteria and navigation or route-based criteria. A third option in the list generated at block 638 includes the machine performing the harvest using its available capabilities, but with increased grain loss. Thus, this modification involves an adjustment to performance-based criteria, to allow the combine to proceed with lower grain loss performance metrics. At block 640, the combine determines that, based on current or future conditions, weather is not an issue, which may otherwise support selection of the third option to perform the harvest with increased grain loss. However, since weather is not an issue in this scenario, the combine selects the second option, that being to harvest other areas of the field while waiting for a human operator to arrive and manual control the combine to harvest the downed crop. Accordingly, control system 104 controls the steering subsystem, propulsion subsystem, and harvesting subsystems to continue harvesting in the other areas of the field where the crop is not down.

In an example of an autonomous automobile, assume the automobile is driving on a roadway and encounters a construction zone, by detecting roadway markers. The vehicle determines that it does not have the capabilities to drive through the construction zone, and method 600 identifies a list of possible modifications including stopping and waiting a time period for a human to arrive and manually drive the automobile through the construction zone. This involves adjustment of a time-based work assignment criteria. Another option is to take an alternative route, around the construction zone. This illustratively involves modifications to a time-based assignment criteria, and a productivity and/or fuel efficiency performance metric. A third option involves the automobile returning to its origin, and discontinuing the route. In this example, the second option can be selected since it provides for a minimal time and productivity penalty, relative to the other options. Accordingly, control system 104 controls the propulsion subsystem, and steering subsystem for the automobile to follow the modified route.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
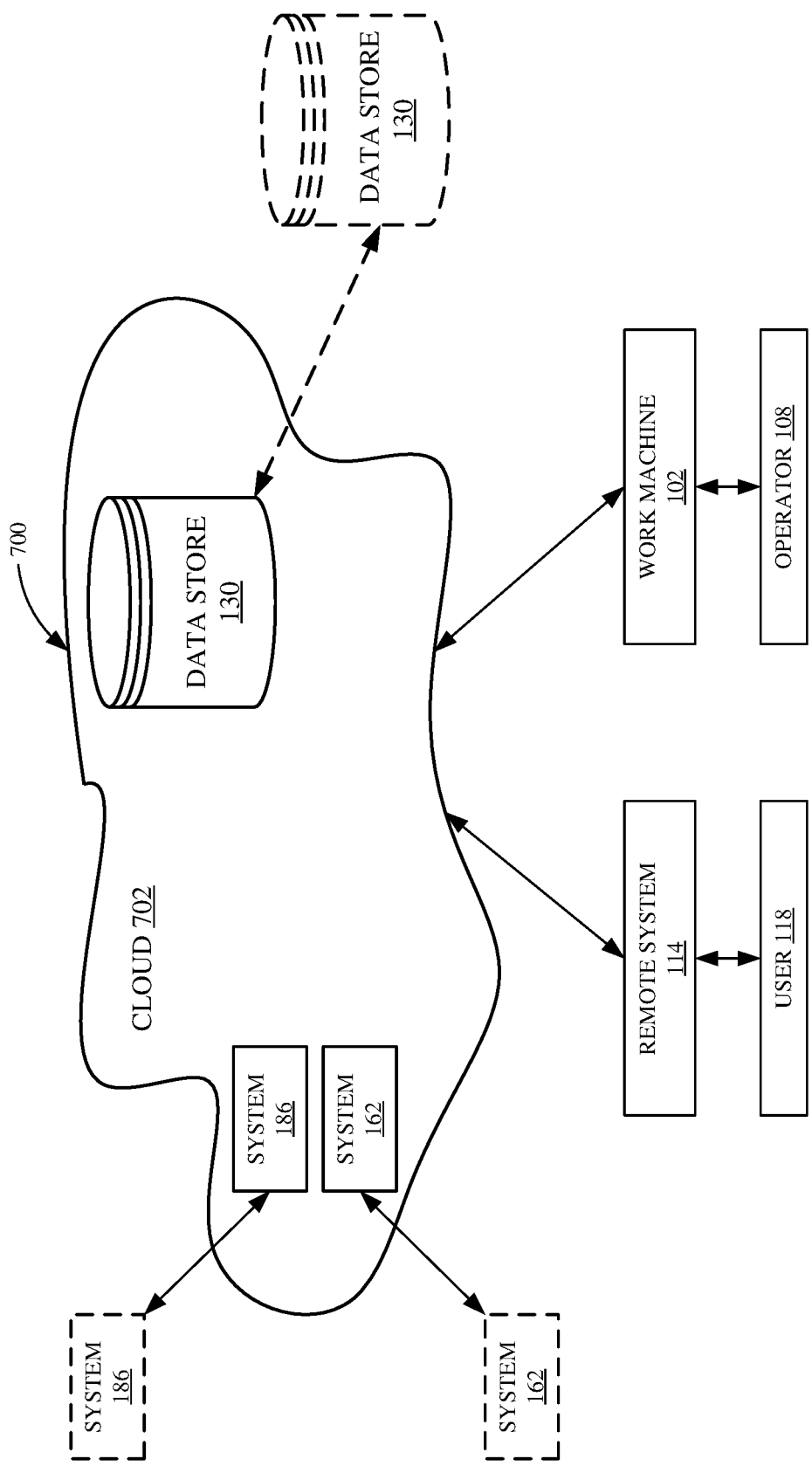
FIG. 7 is a block diagram showing one example of the architecture illustrated in FIG. 1, deployed in a remote server architecture.

FIG. 7 is a block diagram of one example of work machine architecture 100, shown in FIG. 1, where work machine 102 communicates with elements in a remote server architecture 700. In an example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 1 and they are similarly numbered. FIG. 7 specifically shows that system 162, system 186, and data store 130 can be located at a remote server location 702. Therefore, work machine 102 accesses those systems through remote server location 702.

FIG. 7 also depicts another example of a remote server architecture. FIG. 7 shows that it is also contemplated that some elements of FIG. 1 are disposed at remote server location 702 while others are not. By way of example, data store 130 can be disposed at a location separate from location 702, and accessed through the remote server at location 702. Alternatively, or in addition, systems 162 and/or 186 can be disposed at location(s) separate from location 702, and accessed through the remote server at location 702.

Regardless of where they are located, they can be accessed directly by work machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the work machine comes close to the fuel truck for fueling, the system automatically collects the information from the harvester or transfers information to the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the work machine until the work machine enters a covered location. The work machine, itself, can then send and receive the information to/from the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
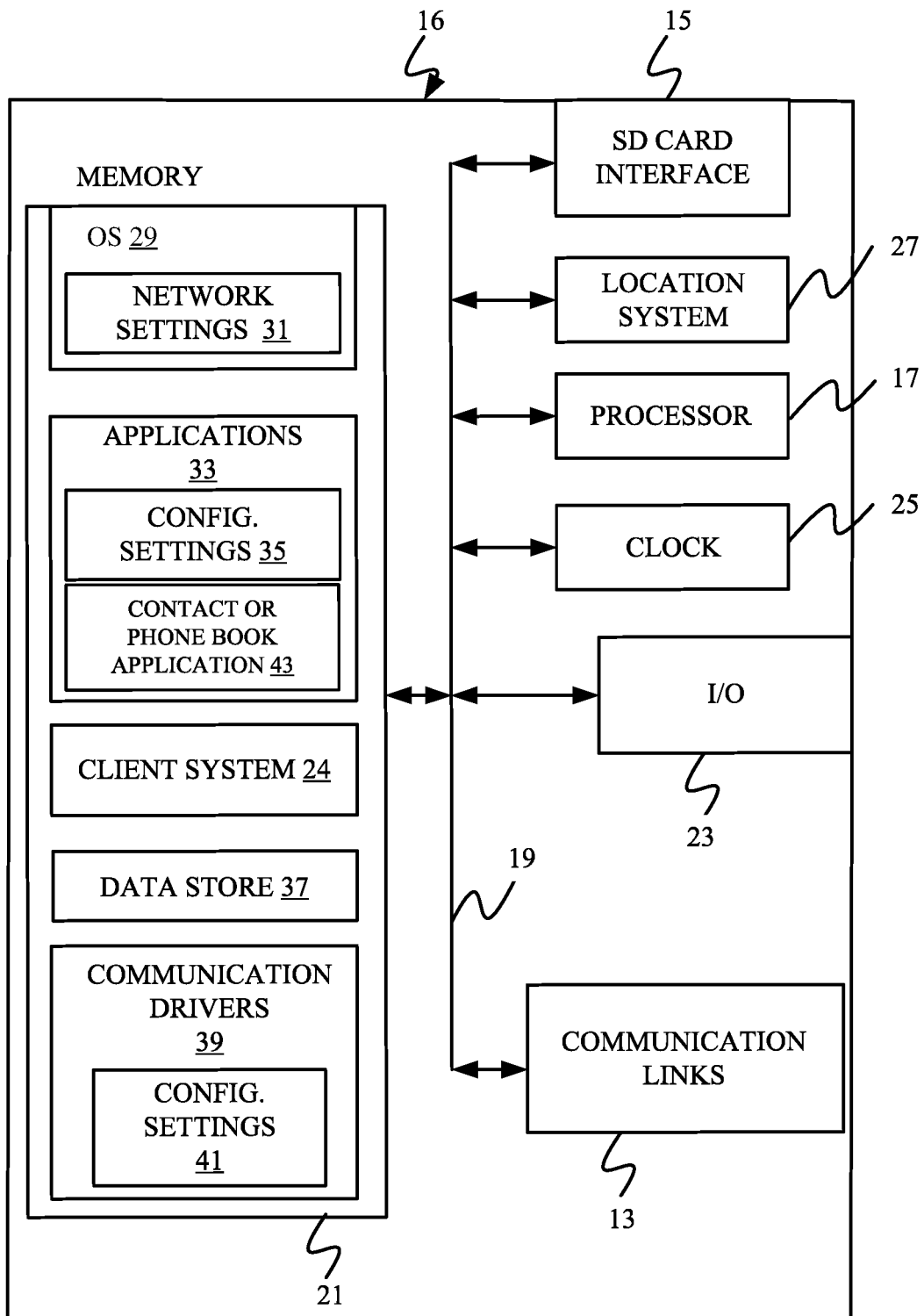
FIGS. 8-10 show examples of mobile devices that can be used in the architectures shown in the previous figures.
Figure 9:
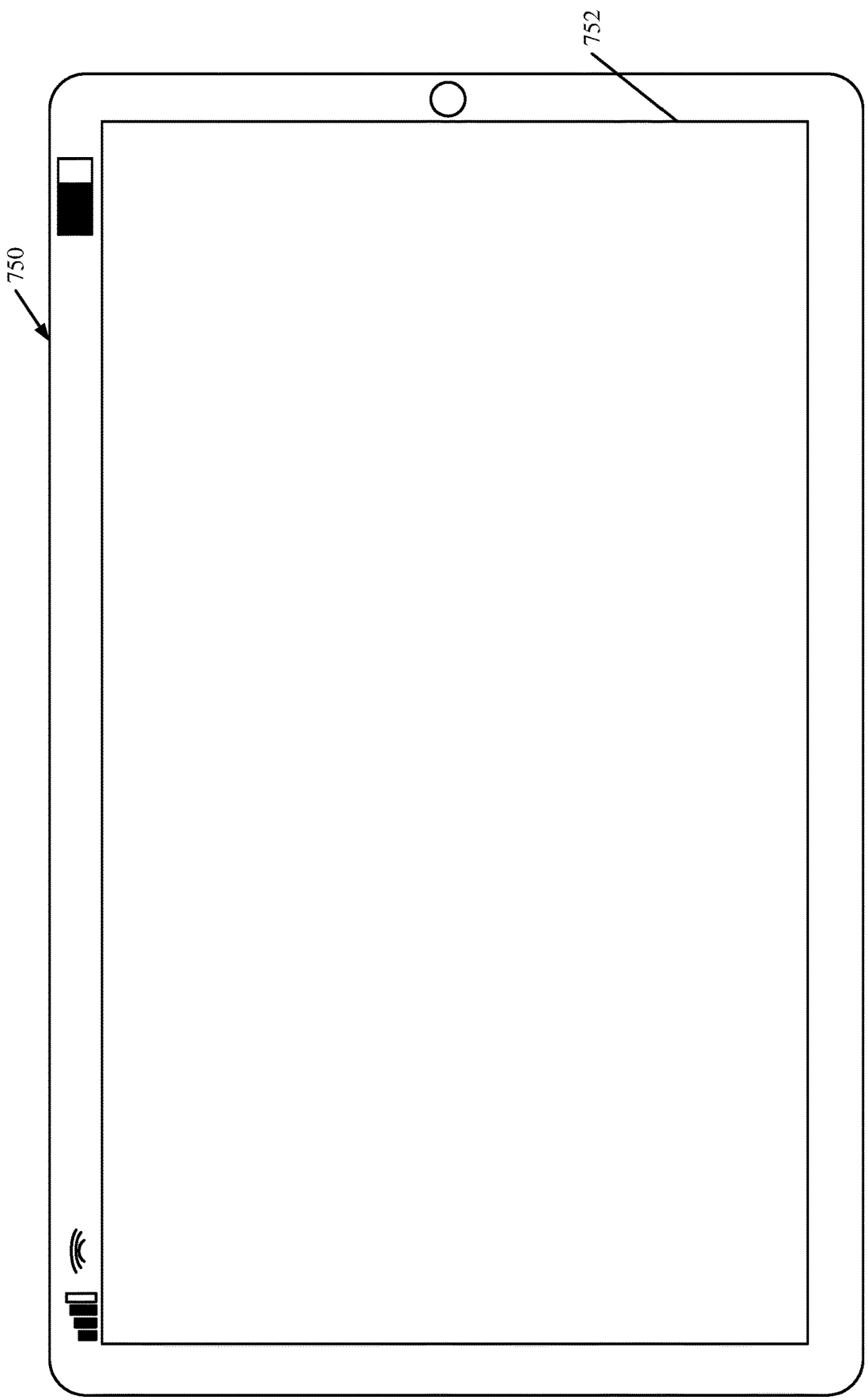
Figure 10:
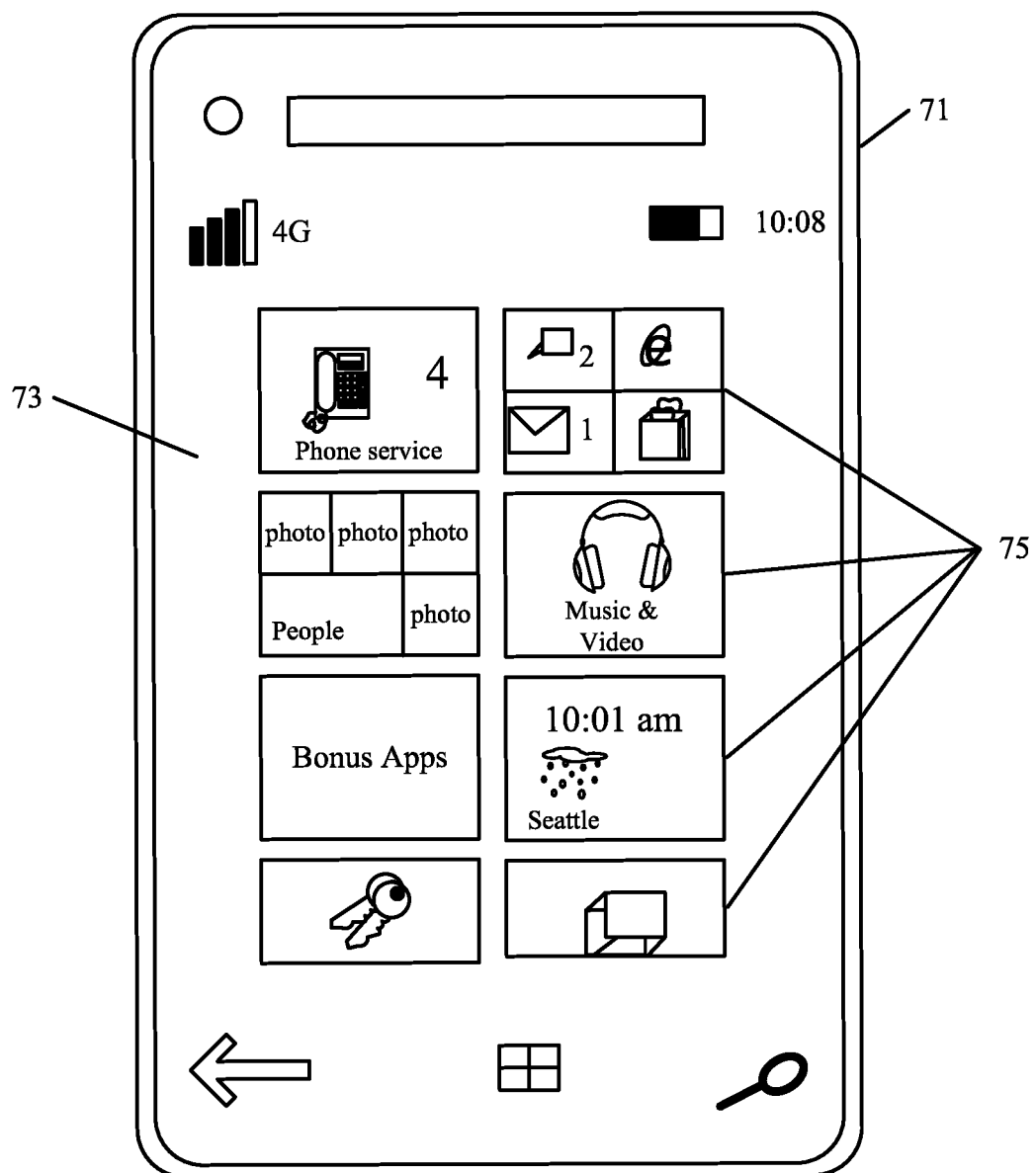

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of work machine 102 or as remote system 114. FIGS. 9-10 are examples of handheld or mobile devices.

FIG. 8 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 750. In FIG. 9, computer 750 is shown with user interface display screen 752. Screen 752 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 750 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
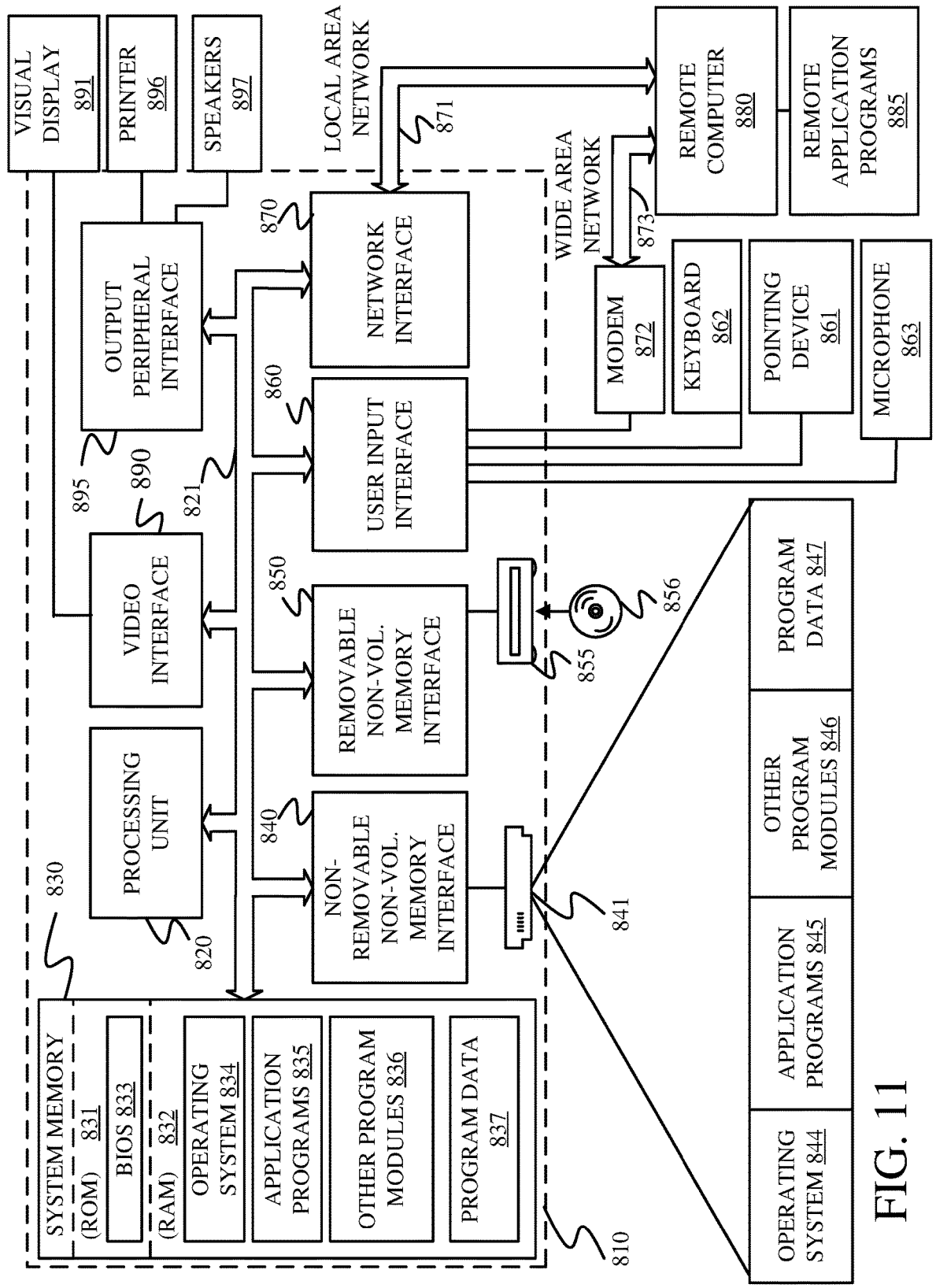
FIG. 11 is a block diagram showing one example of a computing environment that can be used in the architectures shown in the previous figures.

FIG. 11 is one example of a computing environment in which elements of FIG. 1, or parts of it, (for example) can be deployed. With reference to FIG. 11, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a method of controlling a work machine on a worksite, the method comprising:

receiving an indication of a work machine assignment having a worksite location and corresponding assignment criteria associated with completion of the work machine assignment;

receiving a set of worksite conditions at the location;

identifying a set of machine capabilities, each machine capability corresponding to operation of a controllable subsystem on the work machine;

generating a likelihood metric indicative of a likelihood
that the assignment criteria will be met based on the set
of worksite conditions and the set of machine capabilities;
comparing the likelihood metric to a threshold; and
generating a control signal that controls the work machine
based on the comparison.

Example 2 is the method of any or all previous examples, and further comprising:
identifying, for each machine capability, a setting adjustment that adjusts the operation of the controllable subsystem to achieve the machine capability; and
evaluating an effect of the setting adjustment on the likelihood the assignment criteria will be met.

Example 3 is the method of any or all previous examples, wherein generating the control signal comprises:
based on the effect of the setting adjustment, adjusting the operation of the controllable system using the setting adjustment.

Example 4 is the method of any or all previous examples, and further comprising:
modifying the assignment criteria based on the comparison; and
generating the control signal to control the work machine based on the modified assignment criteria.

Example 5 is the method of any or all previous examples, wherein modifying the assignment criteria comprises:
selecting at least one assignment criterion, in the assignment criteria, to be changed based on a change selection criterion; and
modifying the selected at least one assignment criterion.

Example 6 is the method of any or all previous examples, wherein modifying the assignment criteria comprises:
identifying a set of potential alterations to the assignment criterion; and
selecting one of the alterations based on the change selection criterion.

Example 7 is the method of any or all previous examples, wherein the potential alterations comprising one or more of:
a predefined assignment criteria alteration; or
a dynamically generated assignment criteria alteration.

Example 8 is the method of any or all previous examples, wherein the set of conditions comprise one or more current conditions.

Example 9 is the method of any or all previous examples, wherein the set of conditions comprise one or more future conditions.

Example 10 is the method of any or all previous examples, wherein the assignment criteria define a set of requirements for assignment completion.

Example 11 is the method of any or all previous examples, wherein the assignment criteria comprise one or more of:
a path/route for the work machine,
a target performance metric for the work machine, or
a target operation time for completing the work machine assignment.

Example 12 is a work machine comprising:
a set of controllable subsystems;
a machine capability system configured to identify a set of machine capabilities, each machine capability corresponding to operation of at least one of the controllable subsystems;
a work assignment system configured to:
obtain an indication of a work machine assignment having a worksite location and corresponding assignment criteria associated with completion of the work machine assignment; and
receive a set of worksite conditions at the worksite location;
generate a likelihood metric indicative of a likelihood that the assignment criteria will be met based on the set of worksite conditions and the set of machine capabilities; and
compare the likelihood metric to a threshold; and
a control system configured to generate a control signal that controls the work machine based on the comparison.

Example 13 is the computing system of any or all previous examples, wherein the machine capability system is configured to:
identify, for each machine capability, a setting adjustment that adjusts the operation of the controllable subsystem to achieve the machine capability; and
evaluate an effect of the setting adjustment on the likelihood the assignment criteria will be met.

Example 14 is the computing system of any or all previous examples, wherein the work assignment system is configured to:
modify the assignment criteria based on the comparison; and
generate the control signal to control the work machine based on the modified assignment criteria.

Example 15 is the computer system of any or all previous examples, wherein the work assignment system is configured to:
modify the assignment criteria based on a change selection criterion.

Example 16 is the computer system of any or all previous examples, wherein the work assignment system is configured to:
identify a set of potential alterations to the assignment criterion; and
select one of the alterations based on the change selection criterion.

Example 17 is the computing system of any or all previous examples, wherein
the assignment criteria define a set of requirements for assignment completion, and
the set of conditions comprise one or more current or future conditions.

Example 18 is the computing system of any or all previous examples, wherein the assignment criteria comprise one or more of:
a path/route for the work machine,
a target performance metric for the work machine, or
a target operation time for completing the work machine assignment.

Example 19 is a method of controlling a work machine on a worksite, the method comprising:
receiving an indication of a work machine assignment having a worksite location and corresponding assignment criteria associated with completion of the work machine assignment;
receiving a set of worksite conditions at the location;
identifying a set of machine capabilities, each machine capability corresponding to operation of a controllable subsystem on the work machine;
generating a likelihood metric indicative of a likelihood that the assignment criteria will be met based on the set of worksite conditions;
based on determining that the likelihood is below a threshold, identifying a set of alterations to the assignment criterion based on the set of machine capabilities;

selecting one of the alterations based on a change selection criterion;
generating modified assignment criteria based on the selected alteration; and
generating a control signal that controls the work machine based on modified assignment criteria.

Example 20 is the work machine of any or all previous examples, wherein generating a likelihood metric comprises:
identifying, for each machine capability, a setting adjustment that adjusts the operation of the controllable subsystem to achieve the machine capability; and
evaluating an effect of the setting adjustment on the likelihood the assignment criteria will be met.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a work machine on a worksite, the method comprising:
    receiving an indication of a work machine assignment having a worksite location and a corresponding assignment criterion associated with completion of the work machine assignment;
    obtaining a setting for a controllable subsystem on the work machine;
    generating a first control signal that controls a first operation of the controllable subsystem at the worksite location in accordance with the work machine assignment using the setting of the controllable subsystem;
    after initiation of the first operation of the controllable subsystem using the setting of the controllable subsystem to perform the work machine assignment:
        receiving an indication of a worksite condition at the worksite location,
        identifying a machine capability corresponding to the first operation of the controllable subsystem on the work machine using the setting,
        generating a first likelihood metric indicative or a likelihood that the assignment criterion will be met based on the worksite condition and the machine capability,
        based on determining that the first likelihood metric is below a threshold, identifying a setting adjustment for the setting of the controllable subsystem,
        generating a second likelihood metric indicative of a likelihood that the assignment criterion will be met based on an effect of the setting adjustment, and
        selecting the setting adjustment based on a determination that the second likelihood metric is above the threshold; and
    generating a second control signal that controls a second operation of the controllable subsystem using the selected setting adjustment.

2. The method of claim 1, wherein identifying the setting adjustment for the setting comprises identifying the setting adjustment using a machine learning setting adjustment system.

3. The method of claim 2, and further comprising:
    training the machine learning setting adjustment system based on the effect of the setting adjustment on the likelihood that the assignment criterion will be met.

4. The method of claim 1, and further comprising:
    modifying the assignment criterion, to obtain a modified assignment criterion, based on the determining that the first likelihood metric is below the threshold; and
    generating the first control signal and/or the second control signal based on the modified assignment criterion.

5. The method of claim 4, and further comprising:
    receiving a plurality of assignment criteria associated with the completion of the work machine assignment, wherein modifying the assignment criterion comprises:
        selecting at least one assignment criterion, in the plurality of assignment criteria, to be changed based on a change selection criterion; and
        modifying the selected at least one assignment criterion by:
            identifying a set of potential alterations to the at least one assignment criterion, wherein each potential alteration of the set of potential alterations comprises one or more of a predefined assignment criterion alteration or a dynamically generated assignment criterion alteration; and
            selecting a potential alteration in the set of potential alterations based on the chance selection criterion.

6. The method of claim 1, wherein:
    the work machine comprises an agricultural machine;
    the second operation comprises an agricultural operation;
    the worksite location comprises a field;
    the agricultural machine comprises a set of ground engaging elements configured to convey the agricultural machine over the field;
    the controllable subsystem is configured to perform the agricultural operation on the field; and
    the assignment criterion comprises a target performance metric representing performance of the agricultural operation.

7. The method of claim 6, wherein:
    the agricultural machine comprises an agricultural harvesting machine;
    the controllable subsystem comprises a harvesting system that harvests crop from the field; and
    the target performance metric represents harvesting performance of the harvesting system.

8. The method of claim 1, wherein the worksite condition comprises one or more of a current condition or a future predicted condition.

9. The method of claim 1, wherein the worksite condition comprises one or more of a terrain condition or a weather condition.

10. The method of claim 1, wherein the assignment criterion defines a requirement for assignment completion related to:
    a path for the work machine, and/or
    a target operation time for completing the work machine assignment.

11. The method of claim 1, wherein the assignment criterion comprises a target performance metric for the work machine.

12. A work machine comprising:
    a set of controllable subsystems;
    at least one processor; and
    memory storing instructions executable by the at least one processor, wherein the instructions, when executed, cause the at least one processor to:
        identify a set of machine capabilities, each machine capability corresponding to operation of at least one controllable subsystem of the set of controllable subsystems;

obtain an indication of a work machine assignment having a worksite location and a to get performance metric associated with completion of the work machine assignment; and after initiation of the operation of the at least one controllable subsystem to perform the work machine assignment:

receive a set of worksite conditions at the worksite location;

generate a likelihood metric indicative of a likelihood that the target performance metric will be met based on the set of worksite conditions and the set of machine capabilities;

compare the likelihood metric to a threshold; and generate a control signal that controls the work machine based on the comparison.

13. The work machine of claim 12, wherein the instructions, when executed, cause the at least one processor to:

identify, for each machine capability, a setting adjustment that adjusts the operation of the at least one controllable subsystem; and evaluate an effect of the setting adjustment on the target performance metric.

14. The work machine of claim 12, wherein the instructions, when executed, cause the at least one processor to:

modify the target performance metric based on the comparison; and generate the control signal to control the work machine based on the modified target performance metric.

15. The work machine of claim 14, wherein the instructions, when executed, cause the at least one processor to:

modify the target performance metric based on a change selection criterion.

16. The work machine of claim 15, wherein the instructions, when executed, cause the at least one processor to:

identify a set of potential alterations to the target performance metric; and select a potential alteration in the set of the alterations based on the change selection criterion.

17. The work machine of claim 12, wherein the target performance metric defines a set of requirements for assignment completion, and the set of worksite conditions comprise one or more current or future conditions.

18. The work machine of claim 12, wherein the instructions, when executed, cause the at least one processor to:

obtain the indication of an assignment criterion comprising one or more of:

a path/route for the work machine, and/or a target operation time for completing the work machine assignment.

19. A method of controlling a work machine on a worksite, the method comprising:

receiving an indication of a work machine assignment having a worksite location and an assignment criterion associated with completion of the work machine assignment;

receiving a set of worksite conditions at the worksite location;

identifying a set of machine capabilities, each machine capability corresponding to operation of a controllable subsystem on the work machine;

generating a likelihood metric indicative of a likelihood that the assignment criterion will be met based on the set of worksite conditions;

based on determining that the likelihood is below a threshold, identifying a plurality of potential alterations to the assignment criterion, wherein each respective potential alteration in the plurality of potential alterations is identified based on the set of machine capabilities and a determination that the respective potential alteration results in a likelihood that meets or exceeds the threshold;

selecting a selected alteration from the plurality of potential alterations based on a change selection criterion;

generating modified assignment criterion based on applying the selected alteration to the assignment criterion; and generating a control signal that controls the work machine based on modified assignment criterion.

20. The method of claim 19, wherein generating the likelihood metric comprises:

identifying, for each machine capability, a setting adjustment that adjusts the operation of the controllable subsystem to achieve the machine capability; and evaluating an effect of the setting adjustment on the likelihood the assignment criterion will be met.

* * * * *